Dec. 22, 1953   W. T. LIVERMORE   2,663,393
AUTOMATIC CLUTCH
Filed Jan. 29, 1949
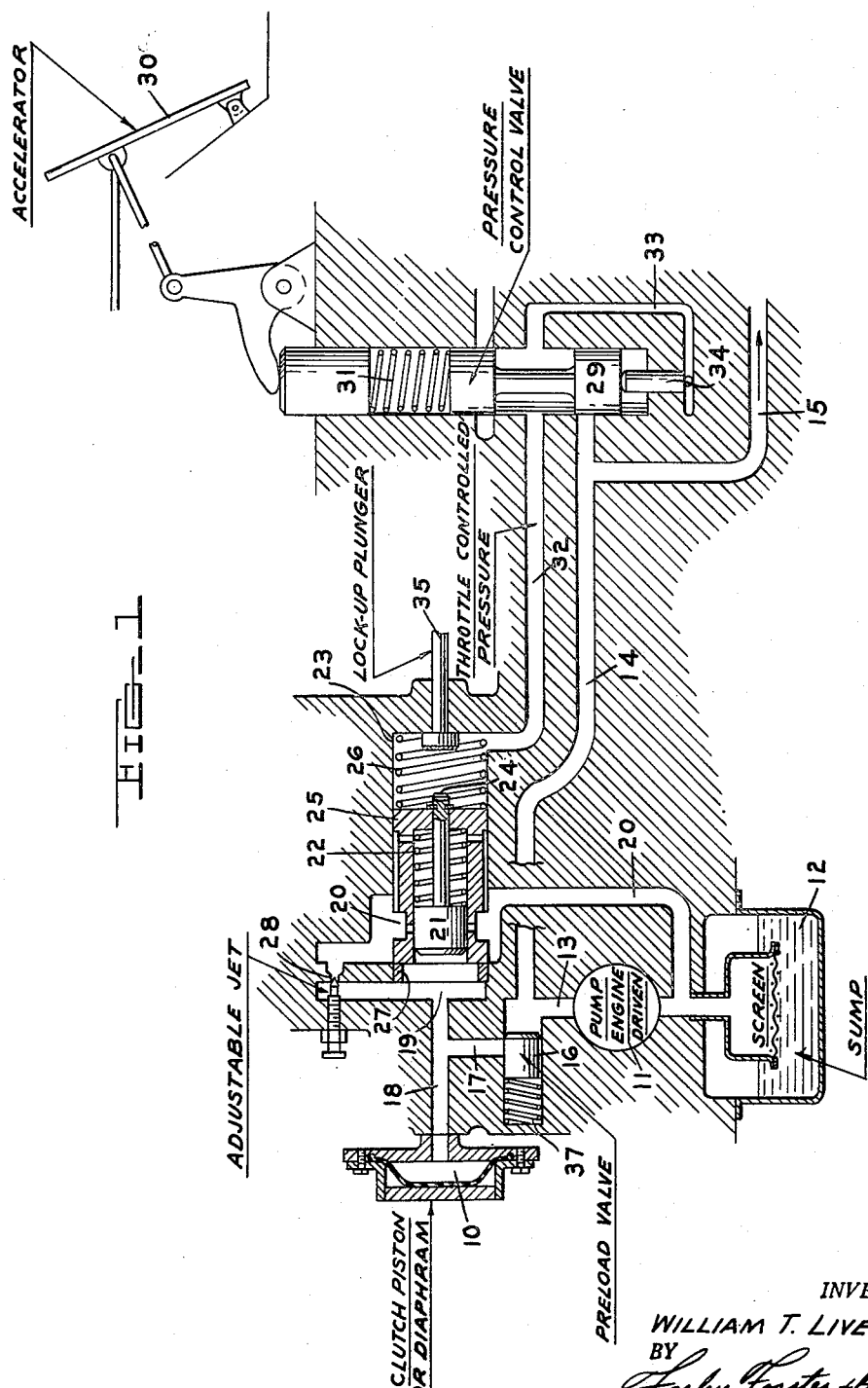
INVENTOR.
WILLIAM T. LIVERMORE
BY
*Farley, Forster & Farley*
ATTORNEYS Patented Dec. 22, 1953

2,663,393

UNITED STATES PATENT OFFICE 2,663,393

AUTOMATIC CLUTCH

William T. Livermore, Grosse Pointe Farms, Mich.

Application January 29, 1949, Serial No. 73,615

27 Claims. (Cl. 192—.07)

This invention relates to automatic transmissions for self-propelled vehicles and more particularly to improvements in the control system for effecting automatic engagement of a friction clutch employed in engaging drive.

In my United States Letters Patent Nos. 2,633,035 and 2,604,197, I have disclosed progressive developments in an automatic transmission employing a pair of friction clutches which are alternately engaged to produce drive from the engine to the propeller shaft through a plurality of gear trains of different ratios and the present application forms a continuation in part thereof. In each of such prior applications one or more complete transmission units is shown including the automatic control system for effecting shifts from one speed ratio to another as well as for initiating drive through the engagement of a low speed clutch. The low speed clutch engagement in each case has been effected through the combined or differential operation of a mechanism responsive to engine speed, together with a fluid pressure actuated mechanism responsive to accelerator position. Such devices have operated to urge clutch facings together with a force limited by the effective accelerator controlled fluid pressure as well as by the effective engine speed, the conventional manually operated clutch pedal being completely dispensed with.

In providing controls for automatic clutch engagement in a transmission of the type disclosed in my aforementioned prior applications a number of factors must be taken into consideration. It is desirable to provide low speed clutch engagement pressure effective to establish initial drive in a manner relating such pressure to engine speed in order to accomplish smooth engagement of engine torque, avoid excessive slipping and, at the same time, obtain clutch pressure which will vary with the degree of acceleration required. On the whole, a fluid pressure actuated clutch engagement centrifugally controlled to provide clutch pressure increasing with engine speed is saisfactory under normal driving conditions.

One problem in automatic clutch engagements arises in cars which are equipped with devices for producing high idling speeds during the warm-up period of the engine. It is clear that a centrifugally actuated clutch adjusted to produce initial clutch engagement at an engine speed slightly above normal idling speed would result in undesired clutch engagement when the engine is idling at an abnormally high speed with the vehicle at a standstill, unless some provision is made to avoid clutch engagement under such conditions. This latter problem was met by a differential arrangement in my prior constructions whereby centrifugal effect responsive to engine speed would normally control initial clutch engagement pressure subject to the limitation of the effective fluid pressure controlled by the accelerator position. Thus, when the accelerator was released, a high idling speed was not effective to produce clutch engagement.

Clutch pressure control increasing with engine speed was obtained in the structures shown in the aforementioned Patent No. 2,633,035, and the first modification of Patent No. 2,604,197, through the use of a plurality of lever arms rotated at engine speed which were adapted to transform centrifugal force into clutch pressure. In such cases fluid pressure diaphragms or pistons formed reaction members for the weighted levers in a manner whereby clutch engagement could be obtained only when sufficient fluid pressure, as controlled by accelerator position, was admitted to the diaphragms or pistons. This arrangement was satisfactory in operation, but comparatively expensive to manufacture.

In the second modification of the latter application, a centrifugally actuated valve was used in place of the weighted levers to produce clutch actuating fluid pressure increasing with engine speed. Such valve was arranged to block an exhaust port communicating with a clutch actuating diaphragm in a manner whereby the clutch actuating fluid pressure required to open the valve would increase with the engine speed. Accelerator control was in this case obtained by a second valve blocking a second exhaust port with a force responsive to accelerator position.

This construction was less expensive than the above mentioned lever arrangement, but still required a valve mounted in the rotating clutch assembly and oil passages to and from the pump located in the stationary housing.

The principal object of the present invention is to provide an automatic clutch pressure control responsive to both engine speed and accelerator wherein control elements may be located entirely within the stationary housing.

Another object is to utilize the pressure head build-up on jets or orifices through which the discharge of an engine driven pump must pass in order to eliminate the prior requirement for rotating weights or valves, and to simplify the establishment of clutch pressure independent of engine speed for certain of the high speed drive ratios.

Another object is to employ a so-called "thin plate orifice" in which the length of the orifice is small compared to its diameter, in order to minimize discharge variations arising from temperature changes in the oil.

Another object is to provide a control device of this type which will incorporate means for establishing a predetermined minimum fluid pressure preload in the clutch actuating mechanism independent of engine speed or accelerator position, such predetermined minimum being less than the pressure required for initial clutch engagement so as to minimize any lag in clutch actuation incidental to building up initial pressure to overcome release springs and moving clutch facings to engaging position, and to keep the diaphragm full of oil.

A further object is to incorporate clutch pressure release means responsive to released accelerator position for preventing any initial clutch engagement when the accelerator is released even though the engine is idling at an abnormally high speed.

Another object is to provide a mechanism for blocking the exhaust orifices in order to obtain a rapid build-up of clutch pressure to a predetermined value increasing with throttle opening and only slightly less than that required to prevent the clutch from slipping.

A further object is to incorporate a simple adjustment whereby the relation between clutch pressure and engine speed may be readily adjusted.

Another object is to use a single engine driven pump as a source of fluid pressure for actuating both clutch and other controls.

A further object is to provide means for blocking the discharge orifices in order that clutch release may be avoided while the vehicle is operating in certain high speed gears regardless of engine speed.

These and other objects will appear more clearly from the following detailed description of a particular embodiment of my invention and from an examination of the drawing wherein a schematic representation of an orifice type clutch pressure control mechanism is shown.

With reference to the drawing, it will be seen that a clutch diaphragm or piston 10, such as disclosed in my aforementioned applications, forms a fluid pressure operated mechanism for producing a clutch engagement pressure proportional to the fluid pressure produced therein. An engine driven pump 11 draws fluid from the sump 12 and discharges the same into the delivery passages 13, 14. Pressure builds up in these passages and in the passage 15 leading to fluid pressure controls for other parts of the transmission until a predetermined maximum pressure, for example eighty pounds per square inch, is established whereupon the preload valve 16 opens permitting fluid under pressure to pass into conduits 17, 18, the clutch actuating diaphragm 10 and the orifice valve chamber 19. A return passage 20 from the orifice valve forms the only exhaust for fluid delivered from the pump with the exception of that consumed intermittently by the other transmission controls, as in shifting gears, separately exhausted to the sump and with the exception of that exhausted by the pressure control valve, as hereinafter described.

As shown in the drawing, the main orifices 20a are blocked by a valve piston 21 which is held in blocking position by a compression spring 22 as well as by any fluid pressure in the chamber 23 acting against the small end 24 of a reduced section of the valve piston 21. A relay valve 25, within the bore of which the valve piston 21 operates, is held by a spring 26 against a valve seat 27 so that the only open passage from the valve chamber 19 to the exhaust chamber 20 is through the adjustable orifice 28 employed to compensate for commercial variations in pump discharge. Fluid pressure in the chamber 23 is controlled by the pressure control valve 29 which is in turn responsive to the position of the accelerator 30, as will be hereinafter more fully described.

The operation of the orifice and relay valves may be seen by following through a typical example. Assuming that an engine is started and warmed up to normal operating temperature and idling speed, the engine driven pump 11 will deliver fluid to passages 13, 14, 15 as well as to the pressure control valve 29. Assuming that the accelerator is in a released position, no pressure will be exerted on spring 31 and no positive pressure will exist in the conduit 32 or chamber 23 since any such pressure would communicate through passage 33 to the end of the small plunger 34 moving the control valve 29 to an exhaust position. When the pressure in passages 13, 14 and 15 has reached the predetermined required operating pressure for the other transmission controls, the preload valve 16 will open and full delivery of the pump, with the exception of a small amount passing through the adjustable orifice 28, will be available to produce pressure against the clutch diaphragm 10 until a predetermined pressure less than that required to overcome the clutch release springs is established in the valve chamber 19. At this time the relay valve 25 will be moved against the pressure of spring 26 permitting discharge through seat 27 and passage 20 to the sump. Since spring 22 is strong enough to resist a greater pressure in chamber 19, plunger 21 will be held to the left, keeping orifices 20a closed.

Assuming that the accelerator is now depressed to a position for slow acceleration, a light pressure will be exerted on spring 31 permitting the establishment of a light pressure in passage 32 and chamber 23 to bring about a balanced condition of the pressure control valve. Such pressure in the chamber 23 will operate against the large area of the relay valve 25 to move it against its seat and will also act on the small end 24 of the piston 21 assisting spring 22 to urge such piston to the left and keep the orifices 20a closed. As long as orifices 20a remain closed, the pressure in chamber 19 and clutch diaphragm 10 is proportional to the firmness with which the relay valve is pressed against seat 27 by its spring 26 and the pressure in chamber 23.

If the accelerator is now depressed a little more, slightly greater pressure will be exerted on spring 31, permitting the establishment of slightly greater pressure in passage 32 and chamber 23. The clutch pressure can thus be controlled entirely in accordance with accelerator position up to a value such that its force on the larger end of plunger 21 becomes great enough to overcome spring 22 plus the pressure of the fluid in chamber 23 upon the smaller end 24 of plunger 21 causing orifices 20a to open. If the engine speed is again slightly increased by opening the throttle still further, the clutch actuating pressure will be controlled by the flow of oil through orifices 20a and will increase substantially in proportion to the square of such engine speed until sufficient pressure is established to overcome clutch slippage. It can, of course, never be greater than a maximum pressure determined by the maximum value of the fluid pressure transmitted to chamber 23 by the pressure control valve, which is in turn limited by safety valve 16.

If the accelerator had been depressed to a still more wide open throttle position, a heavier pressure in the chamber 23 would cause the piston 21 to hold the main orifices 20a closed until a still higher predetermined pressure had been established in the clutch actuating diaphragm 10 after which the main orifices 20a would take over control of the clutch pressure.

It will be seen that with this arrangement the clutch is preloaded during normal idling speed to partially overcome the clutch release springs so that a slight additional pressure incident to an initial increase in pressure in chamber 23 upon depression of the accelerator will be sufficient to produce prompt initial clutch engagement. Since the discharge of the engine driven pump can flow only to the actuating diaphragm 10, the only lag incident to the production of initial clutch engagement is that caused by the necessity of expanding the diaphragm in order to move the clutch facings together.

The limit up to which the clutch pressure is entirely controlled by the accelerator can be high or low according to the weight of spring 22, and the areas of the large and small ends of plunger 21. It should not be more than the light pressures used for maneuvering the car with the clutch slipping. It can be made less than the clutch release spring pressure if spring 22 is made very light. The final clutch pressure would then be entirely controlled by the orifices in accordance with engine speed for any throttle opening.

The case will now be considered where the engine is cold when started and is provided with a high idling device which would cause the engine to run when idling above the speed at which initial clutch engagement would normally take place. Since the accelerator is in released position, no fluid pressure will be exerted in chamber 23 against the ends of the relay valve 25, and the spring 26 is of such a weight as to cause the relay valve to be opened by clutch actuating pressure just prior to the establishment of clutch engagement thereby preventing clutch engagement as long as the accelerator remains released. Upon depression of the accelerator 30, pressure in the chamber 23 urges the relay valve 25 toward its seated position thereby causing clutch actuating pressure to build up in accordance with accelerator position. The clutch is thus controlled by the accelerator until it is depressed sufficiently to cause the engine to slow down to a point where the delivery of the engine driven pump is passed by the orifices 28 and 20a after which the clutch pressure will be controlled by such orifices in normal operation.

In certain speed ratios it is undesirable to have the clutch release at low engine speeds, particularly when ascending a hill or accelerating with open throttle.

A lockup plunger 35 may therefore be actuated when the vehicle is traveling in such higher speed ratios to hold the piston 21 in its closed position in order to maintain clutch engagement pressure limited only by the pressure of spring 26 and the fluid pressure in chamber 23, holding relay valve 25 against its seat 27. This device could also be used to obtain engine braking action in such higher speed ratios regardless of the speed of the engine. Satisfactory means for actuating the lock-up plunger 35 are shown in my prior Patent No. 2,604,197, in accordance with which plunger 35 could be actuated by a member moving in response to the establishment of such ratios. It may also be desirable under some conditions to partially close orifices 20a with plunger 35, thus reducing the minimum engine speed at which there is sufficient pressure to prevent the clutch from slipping.

It will be seen from the above description of my orifice clutch pressure control system that a number of positive advantages are obtained over the centrifugal clutch controls which I have previously employed. Among the most important, it is unnecessary to incorporate the clutch pressure control mechanism in rotating portions of the clutch assembly, thereby reducing substantially the cost of manufacture. In addition, the arrangement shown permits a rapid build-up to predetermined clutch engaging pressures determined by accelerator position, together with engine speed responsive control for clutch pressures above such predetermined engaging pressure.

It will be noted that while the centrifugal valve disclosed in my prior Patent No. 2,604,197 could be spring loaded to give a predetermined minimum pressure short of that required to produce initial clutch engagement when the engine was running, no means were provided for the delayed opening of such valve pending the establishment of minimum actuating pressures varying with and controlled by accelerator position. Thus, whereas my prior accelerator control was inherently confined to limiting the clutch pressure to some value less than that corresponding to engine speed, the present accelerator control may be employed where desired to control clutch pressures in excess of those corresponding to engine speed, either, for example, to produce partial clutch engagement during parking maneuvers or to control establishments of predetermined portions of pressures required to overcome slippage for various throttle openings. Such latter feature is another contributing factor to the elimination of lag in response and is believed to be partially responsible for the highly successful operation of the orifice controlled system.

I claim:

1. A drive engagement control adapted for use in a self-propelled vehicle having an engine, a manually operated throttle linkage for controlling the speed of said engine, a driven shaft, and gradually engageable coupling means for establishing drive between said engine and shaft, comprising a fluid pressure operated mechanism for effecting coupling engagement, a source of fluid pressure having a volume capacity increasing with engine speed communicating with said mechanism, an exhaust orifice also communicating with said mechanism and proportioned relative to said volume capacity in a manner adapted to effect desired coupling engagement increasing with engine speed, a further exhaust passage, a valve for blocking said latter exhaust passage urged toward an open position by said fluid pressure for effecting coupling engagement, and a source of fluid pressure controlled by said throttle linkage urging said valve to a closed position.

2. A drive engagement control adapted for use in a self-propelled vehicle having an engine, a driven shaft and gradually engageable coupling means for establishing drive therebetween, comprising a fluid pressure operated mechanism for effecting coupling engagement, a source of fluid pressure communicating with said mechanism having a volume capacity increasing with engine speed, a coupling engagement pressure regulating exhaust orifice also communicating with said mechanism for controlling the effective coupling actuating pressure, an orifice blocking valve associated with said exhaust orifice urged by such actuating pressure to an open position, and means for holding said valve in its orifice blocking position at pressures below a predetermined minimum.

3. A drive engagement control system as set forth in claim 2, including a manually operated throttle linkage for controlling the speed of said engine, a source of pressure varying with said throttle linkage, and means applying said latter pressure to said orifice blocking valve, whereby the coupling actuating pressure at which said valve will open said orifice increases with the progressively actuated position of said throttle linkage.

4. A clutch control adapted for use in a self-propelled vehicle having an engine, a manually operated throttle linkage for controlling the speed of said engine, a driven shaft, and a friction clutch for establishing drive between said engine and shaft having yieldable clutch release means urging the clutch members out of engagement, comprising a fluid pressure operated mechanism for effecting clutch engagement, a source of fluid pressure communicating with said mechanism having a volume capacity increasing with engine speed, an exhaust orifice also communicating with said mechanism for controlling the effective clutch actuating pressure, a valve responsive to such actuating pressure adapted to block the flow of fluid through said orifice at pressures below a predetermined minimum, a further exhaust passage, and a valve responsive to the operation of said throttle linkage for blocking said latter passage.

5. A clutch pressure control system as set forth in claim 4, wherein the clutch actuating pressure at which said first-mentioned valve will open said restricted passage is made responsive to the position of said throttle linkage in a manner whereby increasing throttle opening will result in higher clutch actuating pressures before said restricted passage becomes operative in controlling clutch pressure.

6. A clutch control adapted for use in a self-propelled vehicle having an engine, a manually operated throttle linkage for controlling the speed of said engine, a driven shaft, and a friction clutch for establishing drive between said engine and shaft, comprising a fluid pressure operated mechanism for effecting clutch engagement, a source of fluid pressure having a volume capacity increasing with engine speed communicating with said mechanism, an exhaust orifice also communicating with said mechanism for controlling the effective clutch actuating pressure, a further exhaust passage, a valve adapted to block said latter passage and urged to an opening position by clutch actuating fluid pressure, mechanism responsive to the operation of said throttle linkage for establishing a source of pressure, said latter source of pressure communicating with said valve in a manner urging the same to a blocking position.

7. A clutch pressure control system, as set forth in claim 2, including also a manually operated throttle linkage for controlling the speed of said engine, mechanism responsive to the operation of said throttle linkage for establishing a source of pressure varying with the extent of throttle opening, said latter source of pressure communicating with said first-mentioned valve in a manner urging the same to a blocking position.

8. A drive engagement control adapted for use in a self-propelled vehicle having an engine, a manually operated throttle linkage for controlling the speed of said engine, a driven shaft, and gradually engageable coupling means for establishing drive between said engine and shaft having yieldable coupling release means urging the coupling members out of engagement, comprising a fluid pressure operated mechanism for effecting coupling engagement, a source of fluid pressure communicating with said mechanism having a volume capacity increasing with engine speed, an exhaust orifice also communicating with said mechanism for controlling the effective coupling actuating pressure, mechanism responsive to the operation of said throttle linkage for establishing a source of pressure varying with the extent of throttle opening, a differential valve responsive to coupling actuating fluid pressure as well as to said last mentioned source of pressure adapted to block the flow of fluid through said orifice, a further exhaust passage, and a differential valve responsive to coupling actuating fluid pressure as well as to said last mentioned source of pressure adapted to block said latter passage.

9. A drive engagement control adapted for use in a self-propelled vehicle having an engine, a manually operated throttle linkage for controlling the speed of said engine, a driven shaft, and gradually engageable coupling means for establishing drive between said engine and shaft, comprising a fluid pressure operated mechanism for effecting coupling engagement, a source of fluid pressure communicating with said mechanism having a volume capacity increasing with engine speed, an exhaust orifice also communicating with said mechanism for controlling the effective coupling actuating pressure, a further exhaust passage, mechanism responsive to the operation of said throttle linkage for establishing a source of pressure when the throttle actuating linkage is depressed, a differential valve adapted to block said latter passage, said valve being urged to an open position by coupling actuating pressure and to a closed position by pressure from said last mentioned source.

10. A control system as set forth in claim 9 wherein a certain minimum coupling actuating pressure is required to produce an initial coupling engagement and wherein said valve is preloaded in closed position in a manner providing a coupling actuating pressure less than that required for initial coupling engagement notwithstanding a released position of said throttle actuating linkage.

11. A clutch control adapted for use in a self-propelled vehicle having an engine, a manually operated throttle linkage for controlling the speed of said engine, a driven shaft, and a friction clutch for establishing drive between said engine and shaft, comprising a fluid pressure operated mechanism for effecting clutch engagement, a source of fluid pressure communicating with said mechanism having a volume capacity increasing with engine speed, an exhaust orifice also communicating with said mechanism for controlling the effective clutch actuating pressure, mechanism responsive to the operation of said throttle linkage for establishing a source of pressure varying with throttle opening, a differential valve adapted to block said orifice, said valve being urged to an open position by clutch actuating pressure and to a blocking position by pressure from said last mentioned source.

12. A clutch pressure control system as set forth in claim 11 wherein a certain minimum clutch actuating pressure is required to produce an initial clutch engagement and wherein said valve is urged by resilient means to a blocking position in a manner causing a minimum clutch actuating pressure approaching that required for initial clutch engagement to be maintained independent of engine speed or throttle opening.

13. A clutch control adapted for use in an automatic transmission for a self-propelled vehicle having an engine, a manually operated mechanism for controlling the speed of said engine, a driven shaft and a fluid pressure actuated friction clutch for establishing drive between said engine and driven shaft, characterized by a source of clutch actuating fluid pressure having a volume capacity increasing with engine speed, an exhaust orifice for effecting a clutch actuating pressure increasing with the engine speed, and an orifice blocking valve operative to prevent orifice discharge during initial stages of build up in clutch engaging pressure.

14. A clutch pressure control system for an automatic transmission as set forth in claim 13, wherein said valve is responsive to clutch actuating fluid pressure in a manner blocking the flow of fluid through said orifice when the actuating pressure is below a predetermined minimum.

15. A clutch pressure control system for an automatic transmission as set forth in claim 13, wherein said valve is differentially responsive to clutch actuating fluid pressure and to the position of said manually operated mechanism for blocking the flow of fluid through said orifice when the actuating pressure is below a predetermined minimum varying with the position of said manually operated mechanism.

16. In a clutch pressure control system for an automatic transmission as set forth in claim 13, a further exhaust passage, a valve responsive to clutch actuating fluid pressure and to the position of said manually operated mechanism adapted to block the flow of fluid through said latter passage when said manually operated mechanism is actuated and to open said latter passage when said clutch actuating pressure exceeds a predetermined minimum with said manually operated mechanism in a released position.

17. In a clutch pressure control system for an automatic transmission as set forth in claim 16, a differential valve responsive to clutch actuating fluid pressure and to the position of said manually operated mechanism for blocking the flow of fluid through said orifice when the actuating pressure is below a predetermined minimum determined by the position of said manually operated mechanism, a further exhaust passage, a valve responsive to clutch actuating fluid pressure and to the position of said manually operated mechanism adapted to block the flow of fluid through said latter passage when the clutch actuating pressure is below a predetermined minimum or when said manually operated mechanism is in an actuated position and to open said latter passage when said clutch actuating pressure exceeds a predetermined minimum with said manually operated mechanism in a released position.

18. A clutch control adapted for use in a self-propelled vehicle having an engine, a manually operated throttle linkage for controlling the speed of said engine, a driven shaft, and a friction clutch for establishing drive between said engine and shaft, comprising a fluid pressure operated mechanism for effecting clutch engagement, a source of fluid pressure communicating with said mechanism having a volume capacity increasing with engine speed, an exhaust orifice also communicating with said mechanism for controlling the effective clutch actuating pressure, a further exhaust passage, a pressure control valve responsive to the operation of said throttle linkage for establishing a source of pressure varying with the extent of throttle opening, a pair of valves each differentially responsive to said clutch actuating fluid pressure and said last mentioned source of pressure for controlling respectively the opening of said orifice and the opening of said further exhaust passage, said valves being adapted to maintain a predetermined minimum clutch actuating pressure approaching that required for initial clutch engagement independent of engine speed and to render said orifice inoperative until progressively higher minimum clutch actuating pressures are established in accordance with progressively increased throttle openings, and to render high idling engine speeds ineffective to produce initial clutch engagement when said throttle linkage is in a released position.

19. A drive engagement control adapted for use in a self-propelled vehicle having an engine, a driven shaft and gradually engageable coupling means for establishing drive therebetween, a fluid pressure operated mechanism for effecting coupling engagement characterized by a source of fluid pressure communicating with said mechanism having a volume capacity increasing with engine speed, a coupling engagement pressure regulating exhaust orifice means also communicating with said mechanism in a manner whereby coupling engagement pressure may be made to increase in accordance with engine speed, and a pressure responsive valve mechanism operative to block said orifice means during a preliminary build-up of coupling engagement pressure to a predetermined point.

20. A drive engagement control adapted for use in a self-propelled vehicle having an engine, a driven shaft and gradually engageable coupling means for establishing drive therebetween, a fluid pressure operated mechanism for effecting coupling engagement characterized by a source of fluid pressure communicating with said mechanism having a volume capacity increasing with engine speed, a coupling engagement pressure regulating exhaust orifice means also communicating with said mechanism in a manner whereby coupling engagement pressure may be made to increase in accordance with engine speed, and a pressure responsive valve mechanism operative to block said orifice means during a preliminary build-up of coupling engagement pressure to a predetermined point varying with throttle opening.

21. A clutch control adapted for use in a self-propelled vehicle having a throttle-controlled engine, a driven shaft and a friction clutch for establishing drive therebetween, comprising a fluid pressure operated mechanism for effecting clutch engagement, and an automatic fluid pressure control system for graduating clutch engagement pressure, said control system being characterized by an engine driven pump, an orifice through which the pump output can discharge, thereby to build up fluid pressure in the pressure operated mechanism and to increase the clutch engaging pressure as the speed of the engine increases, means for establishing a control pressure varying with engine throttle opening, and means responsive to said last pressure adapted to close said orifice during the establishment of predetermined minimum clutch engagement pressures increasing with throttle opening.

22. A drive engagement control adapted for use in a transmission for a self-propelled vehicle having an engine, a driven shaft and gradually engageable coupling means for establishing drive therebetween, comprising a fluid pressure actuated mechanism for effecting coupling engagement, and a fluid pressure control system for regulating the coupling engagement pressure, said system including a pump operatively connected to said fluid pressure actuated mechanism, a pressure regulating orifice through which the output from said pump can discharge, and an orifice blocking valve to inhibit flow through said orifice capable of being actuated in response to the establishment of certain drive ratios.

23. A clutch control adapted for use in a transmission for self-propelled vehicles having an engine, a driven shaft and a friction clutch for establishing drive therebetween, comprising a fluid pressure actuated mechanism for effecting clutch engagement, and a fluid pressure control system for regulating the clutch engagement pressure, said system including a pump operatively connected to said fluid pressure actuated mechanism, a pressure regulating orifice through which the output from said pump can discharge, and an orifice blocking valve to block the flow through said orifice capable of being actuated in response to the establishment of certain transmission ratios.

24. A drive engagement control adapted for use in a self-propelled vehicle having an engine, a manually controlled throttle, a driven shaft, and gradually engageable coupling means for establishing drive therebetween, comprising a fluid pressure actuated mechanism for effecting coupling engagement, means for establishing an actuating pressure progressively increasing with throttle opening to establish partial coupling engagement, the degree of which increases with throttle opening, and pressure means responsive to engine speed to complete coupling engagement.

25. A drive engagement control adapted for use in a self-propelled vehicle having an engine, a manually controlled throttle, a driven shaft, and gradually engageable coupling means for establishing drive therebetween, comprising a fluid pressure actuated mechanism for effecting coupling engagement, means responsive to engine speed to increase the coupling engaging pressure with increase in engine speed, a coupling pressure limiting valve, and means for establishing a pressure varying with throttle opening, said last pressure being adapted to actuate said pressure limiting valve.

26. A drive engagement control system as set forth in claim 19, further characterized by said orifice being of a fixed thin plate type, and by the provision of an auxiliary adjustable orifice whereby the relationship between effective coupling pressure and engine speed may be adjustably varied.

27. In a self-propelled vehicle having an engine, a driven shaft and a friction clutch for establishing drive therebetween, a fluid pressure operated mechanism for effecting clutch engagement, and an automatic fluid pressure control system for graduating clutch engagement pressure comprising an engine driven pump, an orifice through which the pump output can discharge, thereby to build up fluid pressure in the pressure operated mechanism and to increase the clutch engaging pressure as the speed of the engine increases, said orifice being of a fixed thin plate type to minimize the effect of changes in viscosity of the fluid on the pressure built up by the flow of fluid through it.

WILLIAM T. LIVERMORE.

References Cited in the file of this patent

UNITED STATES PATENTS

| Number | Name | Date |
| --- | --- | --- |
| 1,650,338 | Fornaca | Nov. 22, 1927 |
| 1,923,819 | Gillett | Aug. 22, 1933 |
| 1,967,730 | Zadig | July 24, 1934 |
| 2,068,579 | Tatter | Jan. 19, 1937 |
| 2,144,074 | Maybach | Jan. 17, 1939 |
| 2,207,041 | Jean-Baptiste | July 9, 1940 |
| 2,450,161 | Price | Sept. 28, 1948 |
| 2,477,710 | Worstell | Aug. 2, 1949 |
| 2,604,197 | Livermore | July 22, 1952 |
| 2,633,035 | Livermore | Mar. 31, 1953 |